(12) United States Patent
Tsuruga (10) Patent No.: US 7,697,682 B2
(45) Date of Patent: Apr. 13, 2010

(54) ENCRYPTION APPARATUS AND ENCRYPTION METHOD

(75) Inventor: Akira Tsuruga, Hokkaido (JP)

(73) Assignee: Sony Corporation, Tokyo (JP)

( * ) Notice: Subject to any disclaimer, the term of this patent is extended or adjusted under 35 U.S.C. 154(b) by 1300 days.

(21) Appl. No.: 11/185,691

(22) Filed: Jul. 21, 2005

(65) Prior Publication Data

US 2006/0023877 A1 Feb. 2, 2006

(30) Foreign Application Priority Data

Jul. 23, 2004 (JP) ............................ P2004-215484

(51) Int. Cl.
*H04L 9/00* (2006.01)
(52) U.S. Cl. .......................................... 380/28; 380/29
(58) Field of Classification Search ........................ None
See application file for complete search history.

(56) References Cited

U.S. PATENT DOCUMENTS 6,708,273 B1 * 3/2004 Ober et al. .................. 713/189

2005/0135608 A1 * 6/2005 Zheng ........................... 380/28

FOREIGN PATENT DOCUMENTS

JP 2003-273389 9/2003

* cited by examiner

*Primary Examiner*—Pramila Parthasarathy
(74) *Attorney, Agent, or Firm*—Rader, Fishman & Grauer PLLC (57) ABSTRACT

An encryption apparatus having an encryption interruption/restart function and temporarily interrupting packet processing accompanied with encryption to first process packets having a higher priority order, having a data storage memory for storing data for processing, a common key cipher block for encrypting transferred data to be processed by a common key cipher, and a memory access controller for controlling the data transfer from the data storage memory to the common key cipher block based on a descriptor providing information instructing the transfer data to be processed from the data storage memory, wherein the descriptor includes a descriptor format for instructing a cipher algorithm in the common key cipher and for instructing an encryption mode, and an encryption method.

1 Claim, 13 Drawing Sheets

DATA TO BE PROCESSED

FIG. 8B

EXAMPLE OF DIVISION PROCESSING

ENCRYPTION APPARATUS AND ENCRYPTION METHOD

CROSS REFERENCES TO RELATED APPLICATIONS

The present invention contains subject matter related to Japanese Patent Application No. 2004-215484 filed in the Japan Patent Office on Jul. 23, 2004, the entire contents of which being incorporated herein by reference.

BACKGROUND OF THE INVENTION

1. Field of the Invention

The present invention relates to an encryption apparatus and an encryption method provided with an interruption/restart function of processing in authentication by a hash algorithm and encryption by a common key cipher.

2. Description of the Related Art

There are a variety of applications for encryption such as decryption of content stored in media and encryption/decryption of data transferred over a network (see for example Japanese Unexamined Patent Publication (Kokai) No. 2003-273389).

For example, data distributed through a network sometimes requires prior processing and transmission of packets having a high priority in order to realize a QoS (Quality Of Service) guaranteeing a certain communication rate.

SUMMARY OF THE INVENTION

However, when packet processing accompanied by encryption is temporarily interrupted to process packets having a high priority order in advance, due to the difference of various types of cipher algorithms and the difference of encryption modes, there were a variety of interruption/restart methods. Therefore, when there was frequent software intervention for judging the conditions thereof etc., there was a disadvantage in the point that the interruption/restart function conversely inhibited realization of the QoS.

It is therefore desirable to provide an encryption apparatus and an encryption method enabling efficient performance of the interruption/restart function without regard as to the difference of the various types of cipher algorithms and the difference of encryption modes.

According to a first aspect of an embodiment of the present invention, there is provided an encryption apparatus having an encryption interruption/restart function and temporarily interrupting packet processing accompanied with encryption to process with precedence packets having a higher priority order, comprising a data storage memory for storing data for processing, a common key cipher block for encrypting transferred data to be processed by a common key cipher, and a memory access controller for controlling the data transfer from the data storage memory to the common key cipher block based on a descriptor providing information instructing the transfer data to be processed from the data storage memory, wherein the descriptor includes a descriptor format for instructing a cipher algorithm in the common key cipher and for instructing an encryption mode.

Preferably, the common key cipher block has a storing portion for setting the data used at the time of the processing in various encryption modes and a storing portion for automatically generating and holding the data which will be used at the time of the next block processing.

Preferably, when the data to be processed is to be interrupted, the descriptor designates an instruction of interruption processing in addition to the designation of a transfer start position and a transfer size.

Preferably, when the data to be processed is to be encrypted, the descriptor designates an instruction of encryption in addition to the designation of the transfer start position and the transfer size.

Preferably, when the data to be processed is to be restarted, the descriptor designates an instruction of restart processing in addition to the designation of the transfer start position and the transfer size.

According to a second aspect of an embodiment of the present invention, there is provided an encryption apparatus having an encryption interruption/restart function and temporarily interrupting packet processing accompanied with encryption to process with precedence packets having a higher priority order, comprising a data storage memory for storing data to be processed, a hash block for hash processing of the transferred data to be processed, and a memory access controller for controlling the data transfer from the data storage memory to the hash block based on a descriptor providing information instructing the transfer data to be processed from the data storage memory, wherein the descriptor includes a descriptor format for instructing a hash algorithm in a hash computation, for instructing an interruption of hash processing, and for instructing a restart of hash processing.

Preferably, the hash block has a storing portion for holding an intermediate computation result at the time of the interruption of the hash processing and a storing portion able to set the intermediate computation result at the time of the restart of the hash processing.

Preferably, when the data to be processed is processed all together without interruption or restart, the descriptor designates no interruption and no restart.

Preferably, when the data to be processed is processed in the initial stage of the hash computation and then the hash computation is interrupted in the middle, the descriptor instructs interruption, but no restart.

Preferably, when the data to be processed is processed in the middle of the hash computation and then the hash computation is interrupted in the middle, the descriptor instructs interruption and restart.

Preferably, when the data to be processed is processed in the middle of the hash computation and then becomes the last data of the hash computation, the descriptor instructs no interruption, but restart.

According to a third aspect of an embodiment of the present invention, there is provided an encryption apparatus having an encryption interruption/restart function and temporarily interrupting packet processing accompanied with encryption to process with precedence packets having a higher priority order, comprising a data storage memory for storing data to be processed, a common key cipher block for encrypting transferred data to be processed by a common key cipher, a hash block for hash processing of the transferred data to be processed, and a memory access controller for controlling data transfer from the data storage memory to the common key cipher block and the hash block based on a descriptor providing information instructing the transfer data to be processed from the data storage memory, wherein the descriptor includes a descriptor format for instructing a cipher algorithm in the common key cipher and for instructing an encryption mode when instructing transfer of data to the common key cipher block, and for instructing a hash algorithm in a hash computation, for instructing an interruption of hash processing, and for instructing a restart of hash processing when instructing transfer of data to the hash block.

According to a fourth aspect of an embodiment of the present invention, there is provided an encryption method for instructing transfer data to be processed from a data storage memory based on a descriptor and temporarily interrupting packet processing accompanied with encryption to process with precedence packets having a higher priority order, wherein the descriptor includes a descriptor format for instructing a cipher algorithm in a common key cipher and for instructing an encryption mode.

According to a fifth aspect of an embodiment of the present invention, there is provided an encryption method for instructing transfer data to be processed from a data storage memory based on a descriptor and temporarily interrupting packet processing accompanied with encryption to process with precedence packets having a higher priority order, wherein the descriptor includes a descriptor format for instructing a hash algorithm in the hash computation, for instructing an interruption of hash processing and for instructing a restart of hash processing.

According to an embodiment of the present invention, transfer data to be processed from a data storage memory is controlled by a memory access controller based on a descriptor.

The descriptor provides information as a descriptor format which has a field for instructing a cipher algorithm of a common key cipher and a field for instructing an encryption mode.

By providing such a format, for example, for data to be processed which must be processed in a DES-CBC mode among all of the data to be processed stored in the data storage memory, the transfer data position, the transfer data size, and DES-CBC mode may be set for each data to be processed.

For example, for data to be processed which must be processed in an AES-Counter Mode, the transfer data position, the transfer data size, and the AES-Counter Mode may be set for each data to be processed.

Further, when the data to be used at the time of the next block processing is automatically generated and held, it is possible to store data at the time of the interruption of the processing and set the stored data at the time of the restart of the processing, whereby the processing is easily restarted.

Further, according to an embodiment of the present invention, a descriptor provides information as descriptor format which has a field for designating a hash algorithm, a field for instructing interruption of hash processing, and a field for instructing restart of hash processing.

For example, for the data to be processed which must be interrupted in MD5 among all data to be processed stored in the data storage memory, the transfer data position, the transfer data size, the MD5, and interruption may be instructed.

For example, for data to be processed which must be restarted in for example SHA-1, the transfer data position, the transfer data size, the SHA-1, and restart may be instructed.

Further, when the intermediate computation result of the hash processing is held, it is possible to store the data which becomes the intermediate result at the time of the interruption of the processing and set the stored data at the time of restart of the processing, whereby the processing is easily restarted.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below, an explanation will be given of embodiments of the present invention with reference to the drawings.

Figure 1:
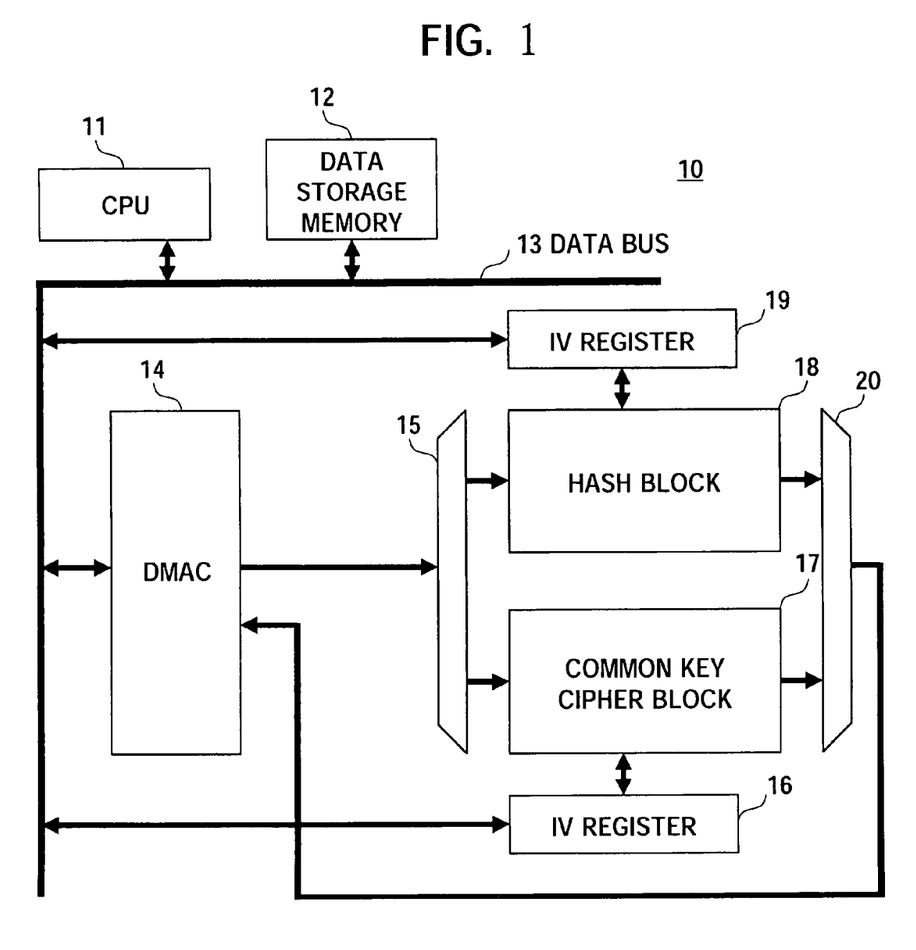
FIG. 1 is a block diagram of an encryption apparatus according to an embodiment of the present invention.

FIG. 1 is a block diagram of an encryption apparatus according to an embodiment of the present invention.

An encryption apparatus 10 according to the present embodiment has, as shown in FIG. 1, CPU 11, data storage memory 12, data bus 13, direct memory access controller (DMAC) 14, selector circuit 15, initial value (IV) register 16, common key cipher block 17, hash block 18, IV register 19, and selector circuit 20. In the present embodiment, the data bus 13 is connected to the CPU 11, data storage memory 12, DMAC 14, IV register 16, and IV register 19.

The encryption apparatus 10 of the present embodiment has the following characteristic feature.

The transfer data to be processed from the data storage memory 12 is controlled by the DMAC 14 based on a DMA descriptor.

The DMA descriptor provides information as a descriptor format which has a field for instructing a cipher algorithm of a common key cipher such as DES (Data Encryption Standard) and AES (Advanced Encryption Standard) and a field for instructing the encryption mode such as ECB (Electronic Code Book) mode, CBC (Cipher Block Chaining) mode, and Counter Mode.

Due to this, among all data to be processed stored in the data storage memory 12, for the data to be processed which must be processed in for example the DES-CBC mode, the transfer data position, the transfer data size, and DES-CBC mode for each data to be processed can be instructed.

While for the data to be processed which must be processed in for example the AES-Counter Mode, the transfer data position, the transfer data size, and the AES-Counter Mode for each data to be processed can be instructed.

Further, the common key cipher block 17 is connected to the IV register 16 and functions as a storing portion for setting the IV used at the time of the processing in various encryption modes (CBC mode and Counter Mode) and as a storing portion for automatically generating and holding the IV which will be used at the time of the next block processing.

Due to this, the IV used at the time of the next block processing is automatically generated and held, therefore by storing the IV at the time of the interruption of the processing and setting the stored IV at the time of the restart of the processing, the restart of the processing is facilitated.

Further, the encryption apparatus 10 of the present embodiment also has the following characteristic feature.

The transfer data to be processed from the data storage memory 12 is controlled by the DMAC14 based on a DMA descriptor.

The DMA descriptor provides information as a descriptor format which has a field for designating a hash algorithm such as an MD5 (Message Digest #5) and SHA-1 (Secure Hash Algorithm), a field for instructing interruption of hash processing, and a field for instructing restart of hash processing.

Due to this, among all data to be processed stored in the data storage memory 12, for example for the data to be processed which must be interrupted in the MD5, the transfer data position, the transfer data size, MD5, and interruption are instructed.

For example, for data to be processed which must be restarted in the SHA-1, the transfer data position, the transfer data size, SHA-1, and restart are instructed.

Further, the hash block 18 is connected to the IV register 19 and functions as a storing portion for holding the intermediate computation result at the time of the interruption of the hash processing and a storing portion able to set the intermediate computation result at the time of the restart of the hash processing.

Due to this, the intermediate computation result of the hash processing is held, therefore by storing the IV which becomes the intermediate result at the time of the interruption of the processing and setting the stored IV at the time of the restart of the processing, the restart of the processing is facilitated.

In the encryption apparatus 10 of the present embodiment, the data storage memory 12 is connected to the data bus 13.

The DMA descriptor is stored in the data storage memory 12 under instruction from the CPU 11 connected to the data bus 13 in the same way.

The DMA descriptor instructs the data to be processed for encryption/decryption or hash processing, a destination of storage of the data to be processed, and the processing method.

Further, the DMAC 14 connected to the data bus 13 in the same way as the above performs the transfer of the target data to be processed stored in the data storage memory 12.

The common key cipher block 17 is connected to the selector circuit 15. The common key cipher block 17 processes the data to be processed transferred by the DMAC 14.

Further, the common key cipher block 17 is connected to the IV register 16. The common key cipher block 17 performs computation using the data stored in the IV register 16 in the case where the encryption mode is the CBC or Counter Mode.

Further, the common key cipher block 17 automatically generates and holds the IV to be used at the time of the next block processing.

Further, the IV register 16 is connected to the data bus 13. The IV register 16 stores/loads the IV data with the data storage memory 12 under the instruction of either the CPU 11 or DMAC 14.

The common key cipher block 17 is connected to the selector circuit 20, and the already processed data is stored in the data storage memory 12 by the DMAC 14.

The hash block 18 is connected to the selector circuit 15. The hash block 18 processes the data to be processed transferred by the DMAC 14.

Further, the hash block 18 is connected to the IV register 19. The hash block 18 performs computation using the data stored in the IV register 19 in the case of restart of the hash computation.

Further the hash block 18 automatically generates and holds intermediate computation data in the IV register 19 in the case of interruption of the hash computation.

Further, the IV register 19 is connected to the data bus 13. The IV register 19 stores/loads the IV data with the data storage memory 12 under the instruction of either the CPU 11 or DMAC 14.

The hash block 18 is connected to the selector circuit 20, and the already processed data is stored in the data storage memory 12 by the DMAC 14.

Below, an explanation will be given of the configurations and functions of the different parts and the specific interruption/restart in the encryption/decryption and the hash processing.

Figure 2:
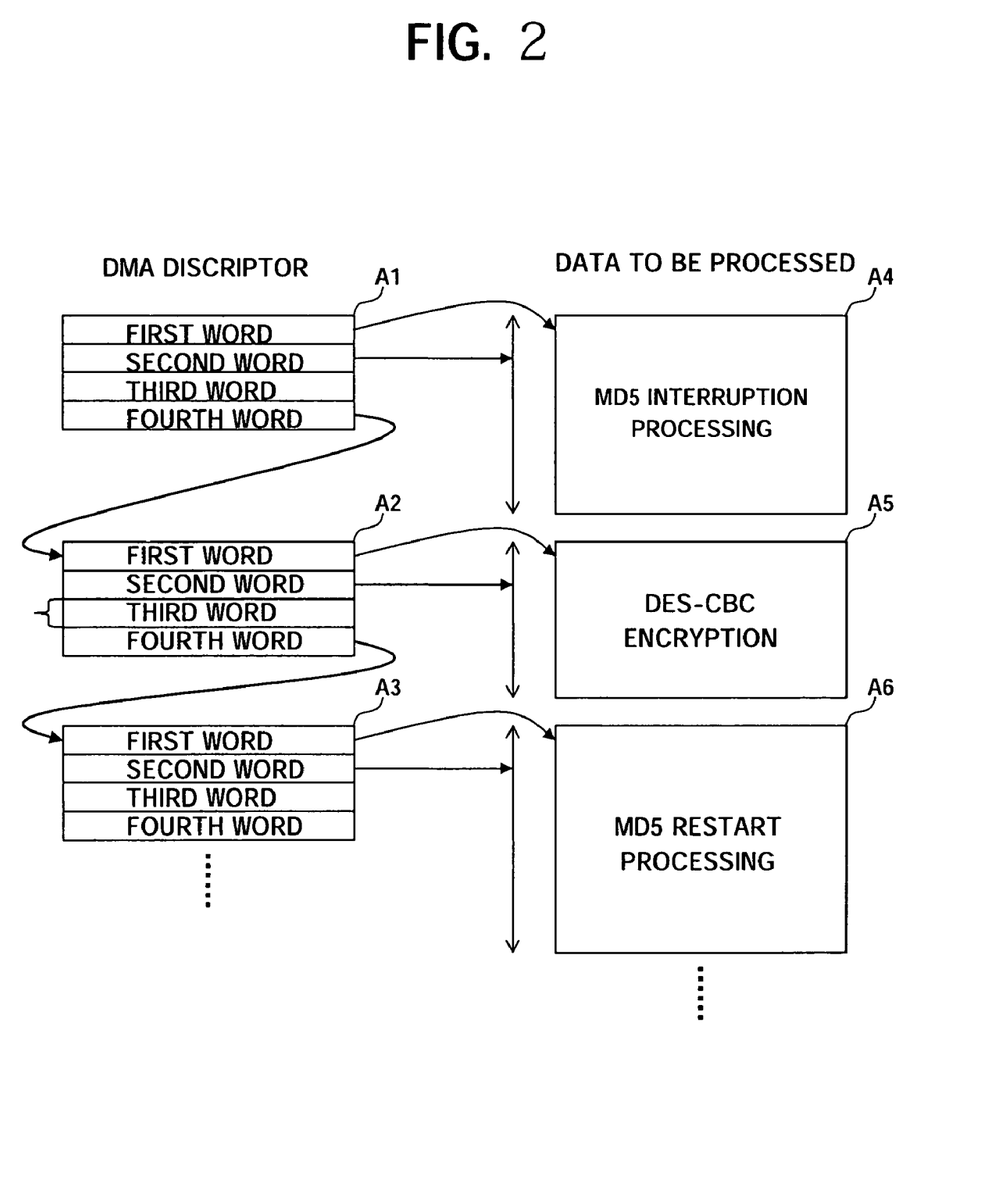
FIG. 2 is a diagram for explaining a situation of linkage of general DMA descriptors and a method for storing information necessary for encryption mode designation/hash mode designation.

FIG. 2 is a diagram of the situation of linkage of a general DMA descriptor and a method for storing information which becomes necessary when instructing the cipher algorithm, encryption mode, hash algorithm, hash interruption, and hash restart.

The example shown here is generally called the "scatter/gather method". The example processes the data to be fetched by using a DMA descriptor for fetching data scattered on the memory and according to the content of the DMA descriptor.

A DMA descriptor A1 of FIG. 2 stores information of data A4 to be processed. Here, as an example of the structure, a first word indicates a header address of the data A4 to be processed, a second word indicates a length of the data A4 to be processed, and a fourth word indicates a header address of a DMA descriptor A2 to be processed next.

In the same way, the DMA descriptor A2 corresponds to data A5 to be processed, and a DMA descriptor A3 corresponds to data A6 to be processed.

Here, the third words of the DMA descriptors A1, A2, and A3 do not overlap the other processing information. For this reason, the third words are allocated regions for storing the instruction information for instructing the cipher algorithm, the encryption mode, the hash algorithm, the hash interruption, and the hash restart.

When the data to be processed is a region covered by interruption in MD5 indicated by A4, the DMA descriptor designates the instruction of interruption in MD5 in addition to designation of the transfer start position and the transfer size.

When the data to be processed is a region covered by DES-CBC encryption indicated by A5, the DMA descriptor designates the instruction of DES-CBC encryption in addition to the designation of the transfer start position and the transfer size.

When the data to be processed is a region covered by the restart in MD5 indicated by A6, the DMA descriptor designates the instruction of restart in MD5 in addition to the designation of the transfer start position and the transfer size.

Figure 3:
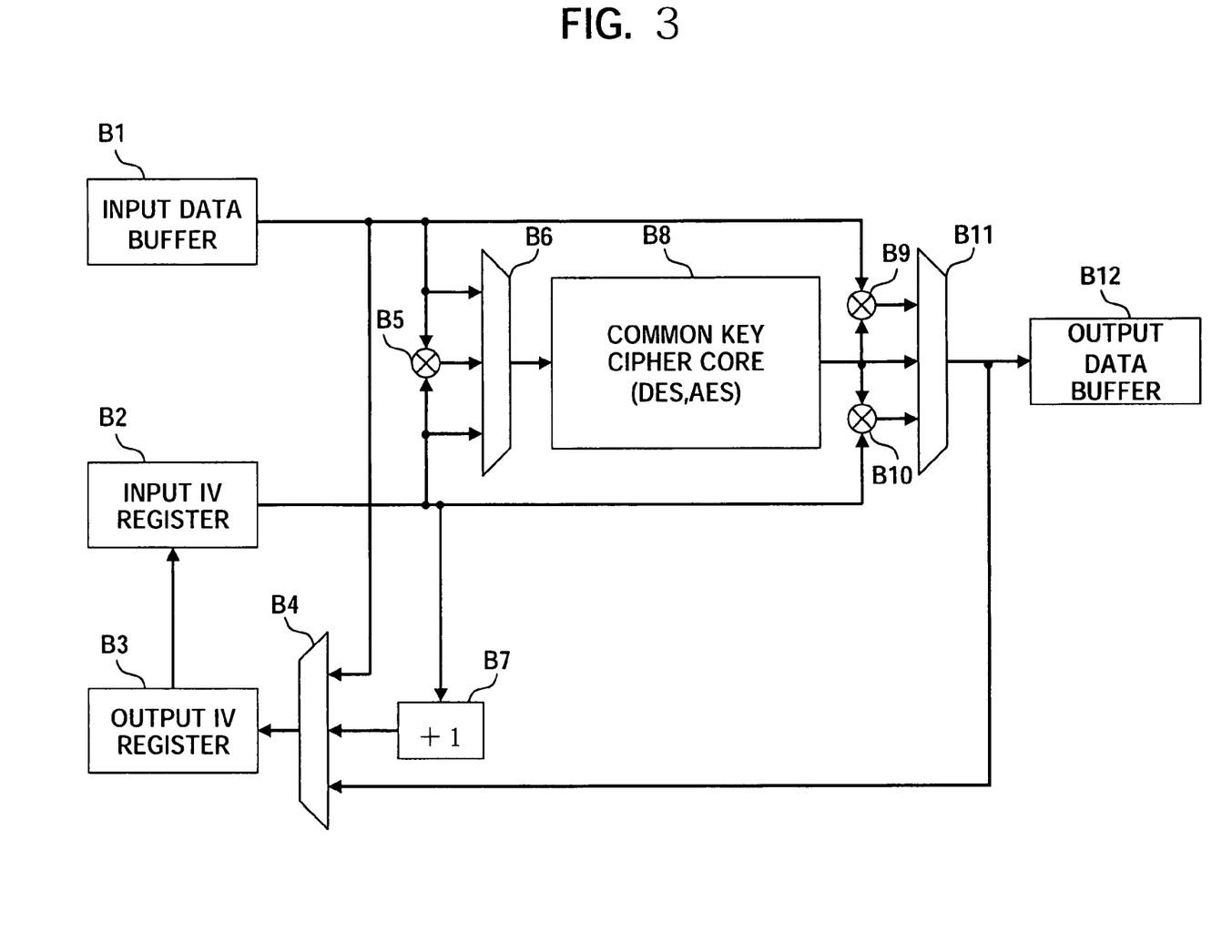
FIG. 3 is a block diagram of an example of the configuration of a common key cipher block of FIG. 1.

FIG. 3 is a block diagram of an example of the configuration of the common key cipher block 17 in the encryption apparatus 10 of FIG. 1.

The common key cipher block 17 of FIG. 3 has an input data buffer B1, input IV register B2, output IV register B3, selector circuit B4, ExOR circuit B5, selector circuit B6, increment circuit B7, common key cipher core (DES, AES) B8, ExOR circuit B9, ExOR circuit B10, selector circuit B11, and output data buffer B12.

The input data buffer B1 fetches the output data from the selector circuit 15 of FIG. 1 and supplies the data to be processed into the common key cipher block 17.

The input IV register B2 fetches the output data from the IV register 16 of FIG. 1 and supplies the IV data into the common key cipher block 17.

The output IV register B3 supplies the IV data automatically generated in the common key cipher block 17 to the IV register 16 of FIG. 1.

The output data buffer B12 supplies the already processed data to the selector circuit 20 of FIG. 1.

The input data to the common key cipher core (DES,AES) B8 is selected by selector circuit B6. Either of the output of the input data buffer B1 or the output obtained by an exclusive OR operation of the input data buffer B1 and the input IV register B2 or the input IV register B2 is selected at the selector circuit B6 and input the selected data to the common key cipher core (DES,AES) B8.

The input data to the output data buffer B12 is selected by the selector circuit B11. Either of the output of the common key cipher core (DES, AES) B8, the output obtained by an exclusive OR operation of the output of the common key cipher core (DES, AES) B8 and the input data buffer B1, or the output obtained by an exclusive OR operation of the output of the common key cipher core (DES, AES) B8 and the input IV register B2 is selected at the selector circuit B11 and input the selected data to the output data buffer B12.

The input data to the output IV register B3 is selected by the selector circuit B4. Either of the output of the input data buffer B1, the output of the selector circuit B11, or the output of the increment circuit B7 for incrementing the input IV register B2 by 1 is selected at the selector circuit B4 and input the selected data to the output IV register B3.

Figure 4:
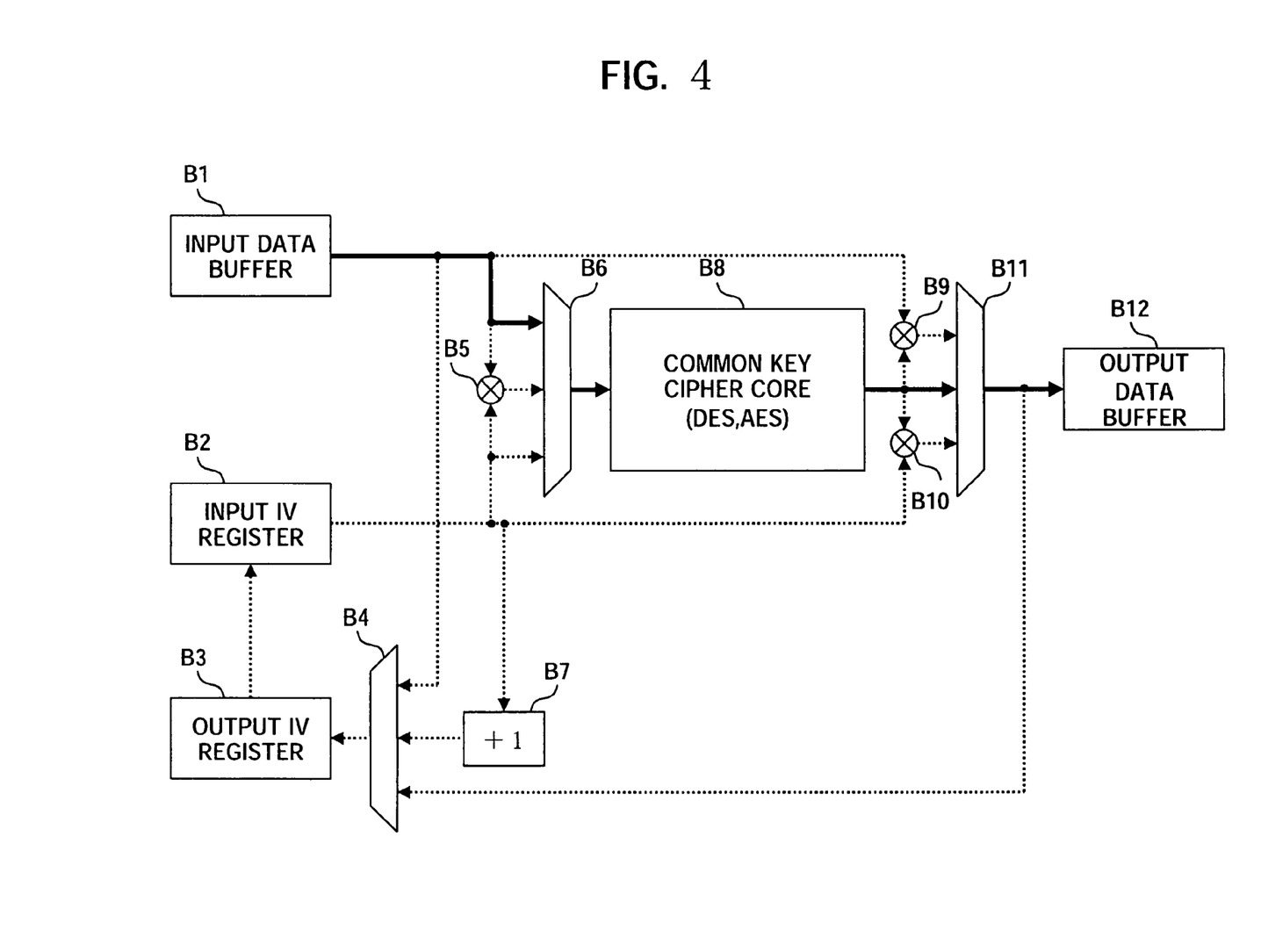
FIG. 4 is a block diagram of a data path in the case of ECB mode encryption/decryption.

FIG. 4 is a diagram of a data path in the case of the ECB mode encryption/decryption in the block diagram of FIG. 3.

A data path selected is indicated by a solid line in FIG. 4 in the block structure shown in the block diagram of FIG. 3 when ECB mode encryption or ECB mode decryption is instructed by the DMA descriptor.

The ECB mode is a mode not using the IV, therefore, in this case, the path to the IV register is disconnected.

Figure 5:
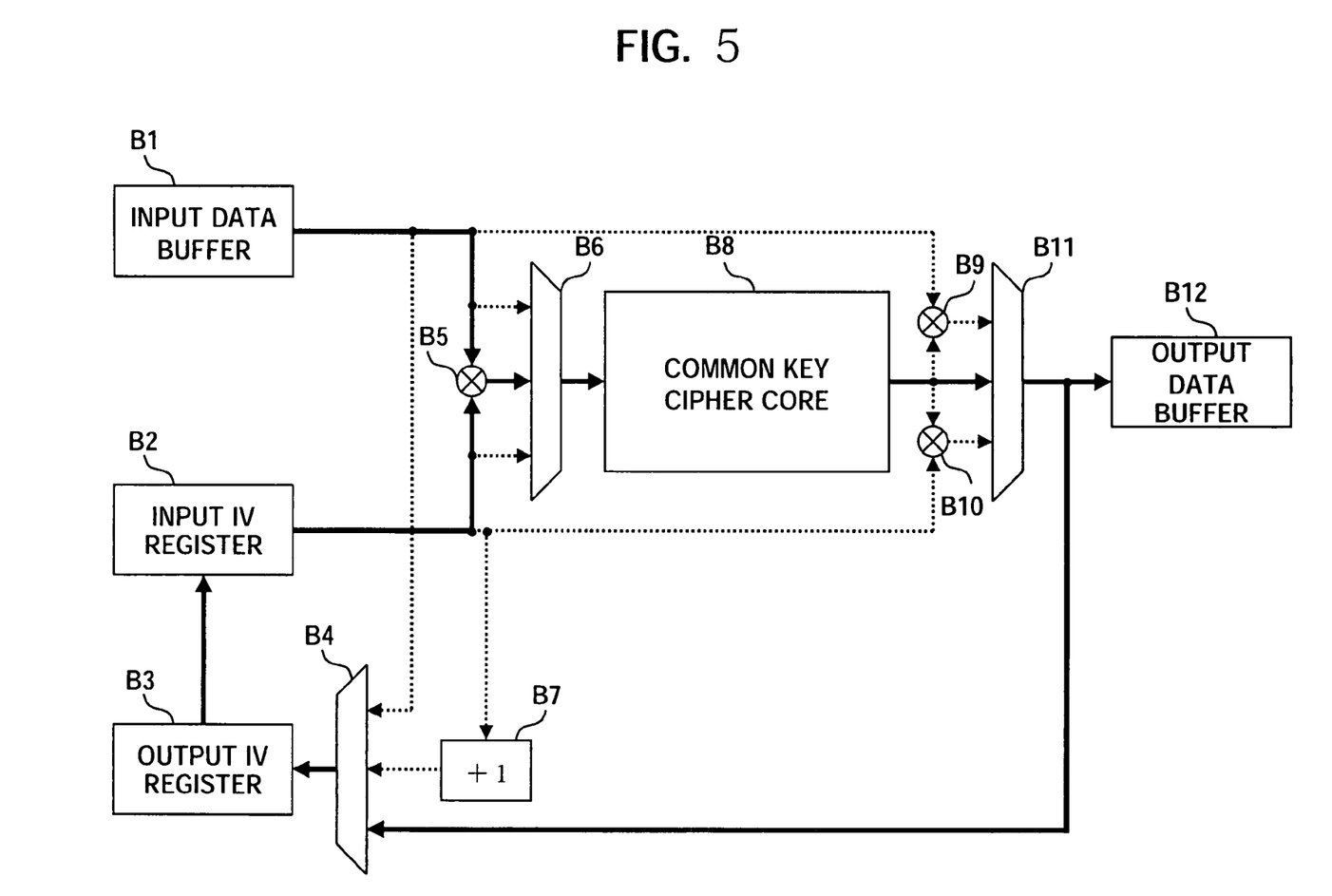
FIG. 5 is a block diagram of a data path in a case of CBC mode encryption.

FIG. 5 is a diagram of a data path in the case of the CBC encryption in the block diagram of FIG. 3.

A data path selected is indicated by the solid line in FIG. 5 in the block structure shown in the block diagram of FIG. 3 when CBC mode encryption is instructed by the DMA descriptor.

In the case of the CBC mode encryption, the input to the common key cipher core B8 is performed that the data obtained by a sequential exclusive OR operation of the data to be processed and IV is input.

As the output as the encryption data, the output of the common key cipher core B8 is output as the already processed data as it is.

Further, the IV to be used at the time of the next block processing will use the data after the encryption. Therefore the output IV register B3 is made to hold the encryption data.

Figure 6:
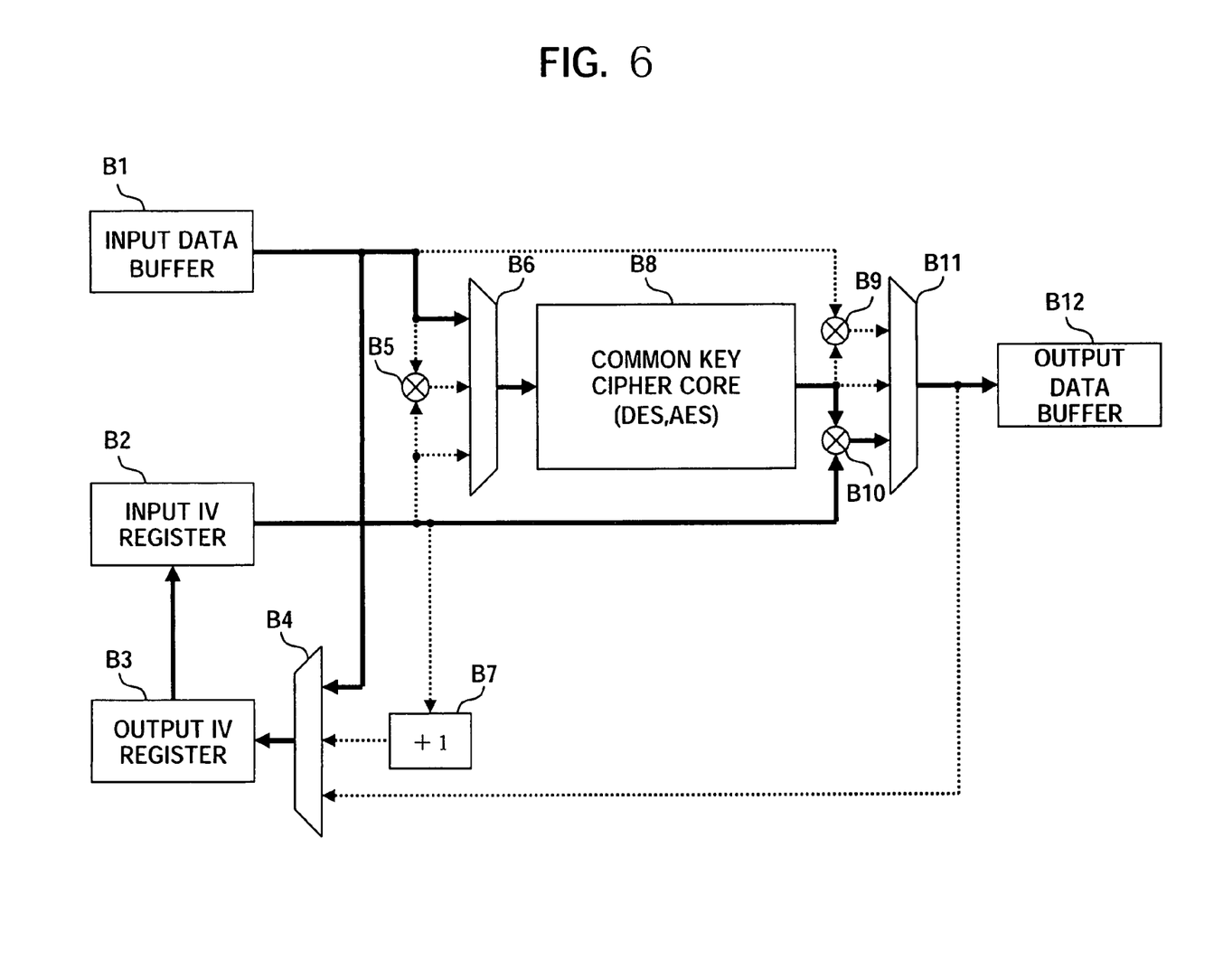
FIG. 6 is a block diagram of a data path in a case of CBC mode decryption.

FIG. 6 is a diagram of a data path in the case of the CBC decryption in the block diagram of FIG. 3.

A data path selected is indicated by the solid line in FIG. 6 in the block structure shown in the block diagram of FIG. 3 when the CBC mode decryption is instructed by the descriptor.

In the case of CBC mode decryption, as the input to the common key cipher core B8, the data to be processed is input as it is. As the output as The encryption data, the data obtained by sequential exclusive OR operations of the output of the common key cipher core B8 and the IV is output as the already processed data.

Further, as the IV to be used at the time of the next block processing, the data before the encryption is used, therefore the output IV register B3 is made to hold the data before encryption (data to be processed).

Figure 7:
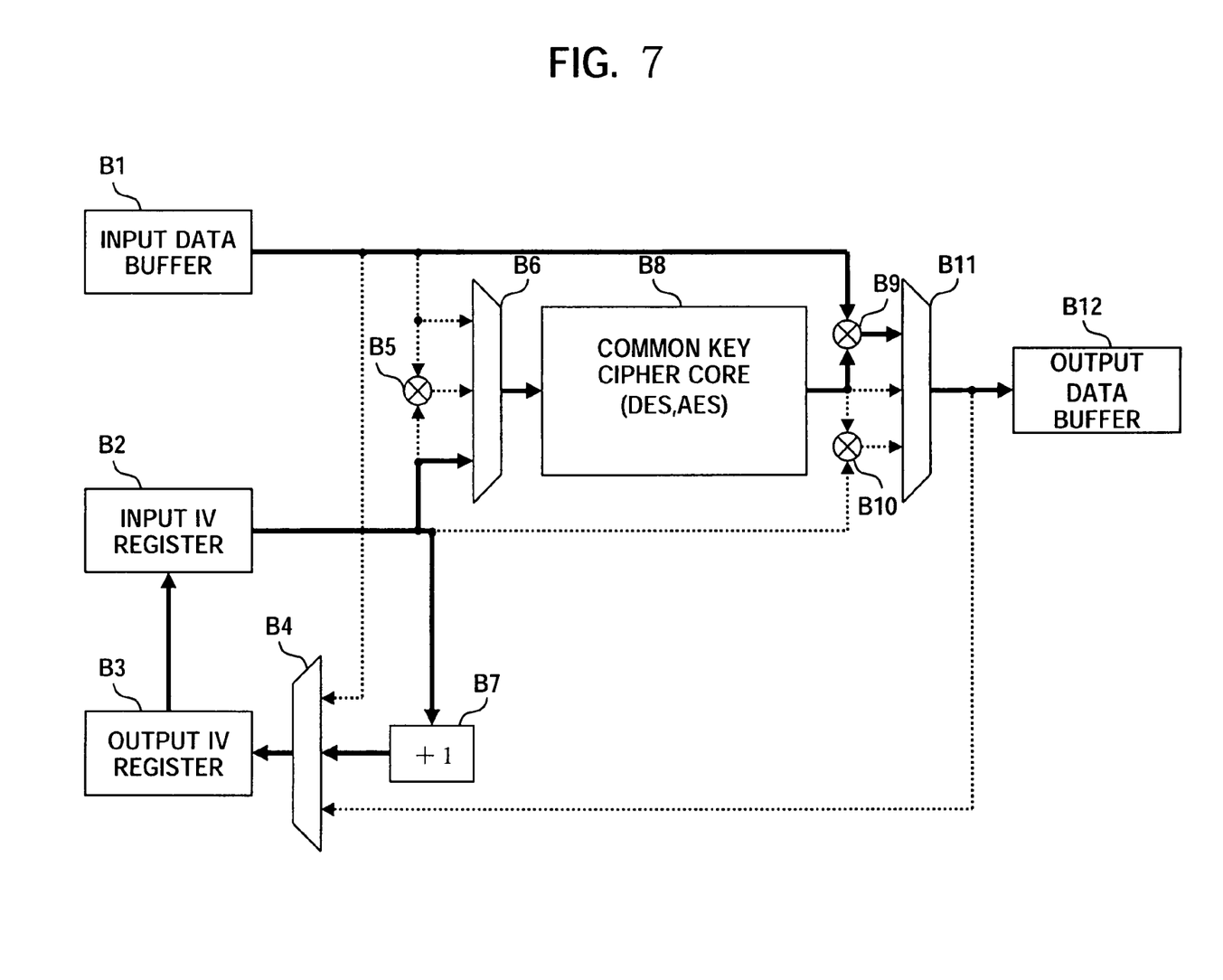
FIG. 7 is a block diagram of a data path in a case of a Counter Mode encryption/decryption.

FIG. 7 is a diagram of a data path in the case of Counter Mode encryption/decryption.

A data path selected is indicated by the solid line in FIG. 7 in the block structure shown in the block diagram of FIG. 3 when the Counter Mode encryption or Counter Mode decryption is instructed by the descriptor.

In the case of the Counter Mode, the same path is used in the encryption and decryption. As the input to the common key cipher core B8, the IV is input, As the output as the encryption data, the data obtained by sequential exclusive OR operations of the output of the common key cipher core B8 and the data to be processed is output as the already processed data.

Further, for the IV to be used at the time of the next block processing, the IV is incremented by 1 and held in the output IV register B3.

Due to this, even when there are a variety of encryption modes (ECB mode, CBC mode, Counter Mode), by just storing/loading the value of the IV register (IV register 16 of FIG. 1) by the CPU 11 or DMAC 14, the encryption interruption/restart easily becomes possible.

Next, an explanation will be given of the interruption/restart of the hash processing with reference to FIGS. 8A and 8B to FIG. 13.

In a hash algorithm, due to the nature of the algorithm, addition with fixed IV data prescribed in the algorithm must be carried out at the time of the end of the processing. But it is necessary to bypass the addition where the processing is interrupted. Therefore a path for bypassing the addition is prepared when instructing interruption by the descriptor.

Further, in the same way, due to the nature of the algorithm, the fixed IV data prescribed in the algorithm must be computed first at the time of the start of the processing. But when the processing is restarted, it is necessary to use the intermediate computation data as the IV in place of the fixed IV data. Therefore, where instructing restart by the descriptor, a path using the IV of the intermediate computation data is prepared.

Figure 8A:
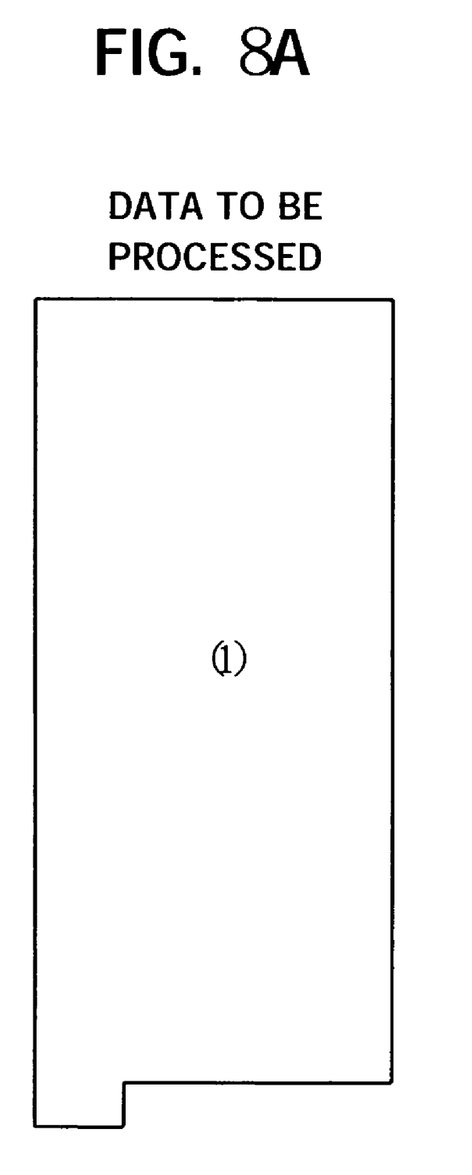
FIGS. 8A and 8B are explanatory views illustrating interruption/restart of hash computation.
Figure 8B:
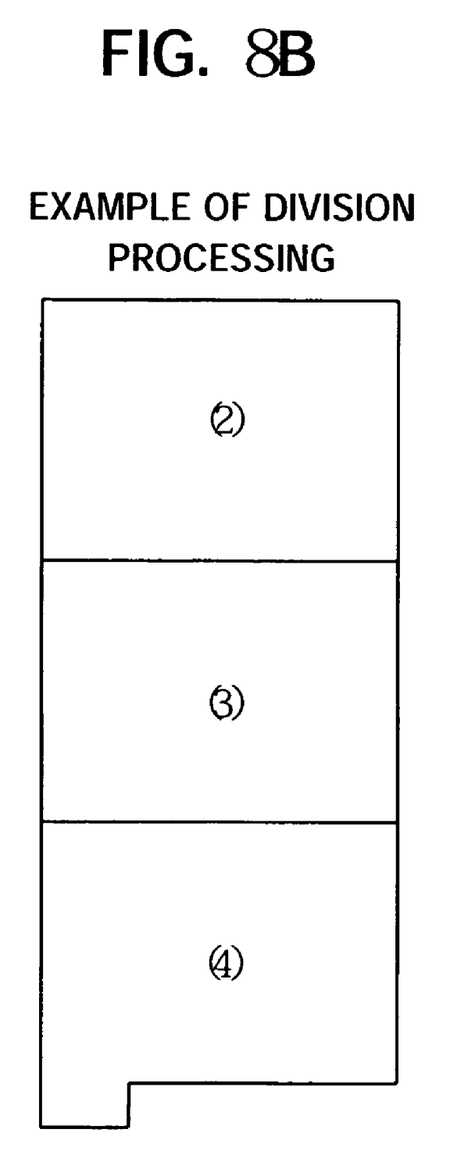

FIGS. 8A and 8B are diagrams for explaining a processing data region which requires instruction of interruption, a processing data region which does not require instruction of interruption, a processing data region which requires instruction of restart, and a processing data region which does not require instruction of the restart in the case where interrupting/restarting hash computation.

(1) in FIG. 8A shows all data to be processed covered by the hash computation. When processing the data of (1) all together with neither interruption or restart, the DMA descriptor designates no interruption and no restart.

(2) to (4) in FIG. 8B show the method of instruction of interruption/restart with respect to each data when processing the data to be processed of (1) in FIG. 8A divided into three.

(2) in FIG, 8B instructs the initial stage of the hash computation and the interruption of the hash computation in the middle, and therefore the DMA descriptor instructs interruption, but no restart.

(3) in FIG. 8B instructs the middle of the hash computation and interruption of the hash computation in the middle, and therefore the DMA descriptor instructs interruption and restart.

(4) in FIG. 8B instructs the middle of the hash computation and the last data of the hash computation, and therefore the DMA descriptor instructs no interruption, but restart.

Figure 9:
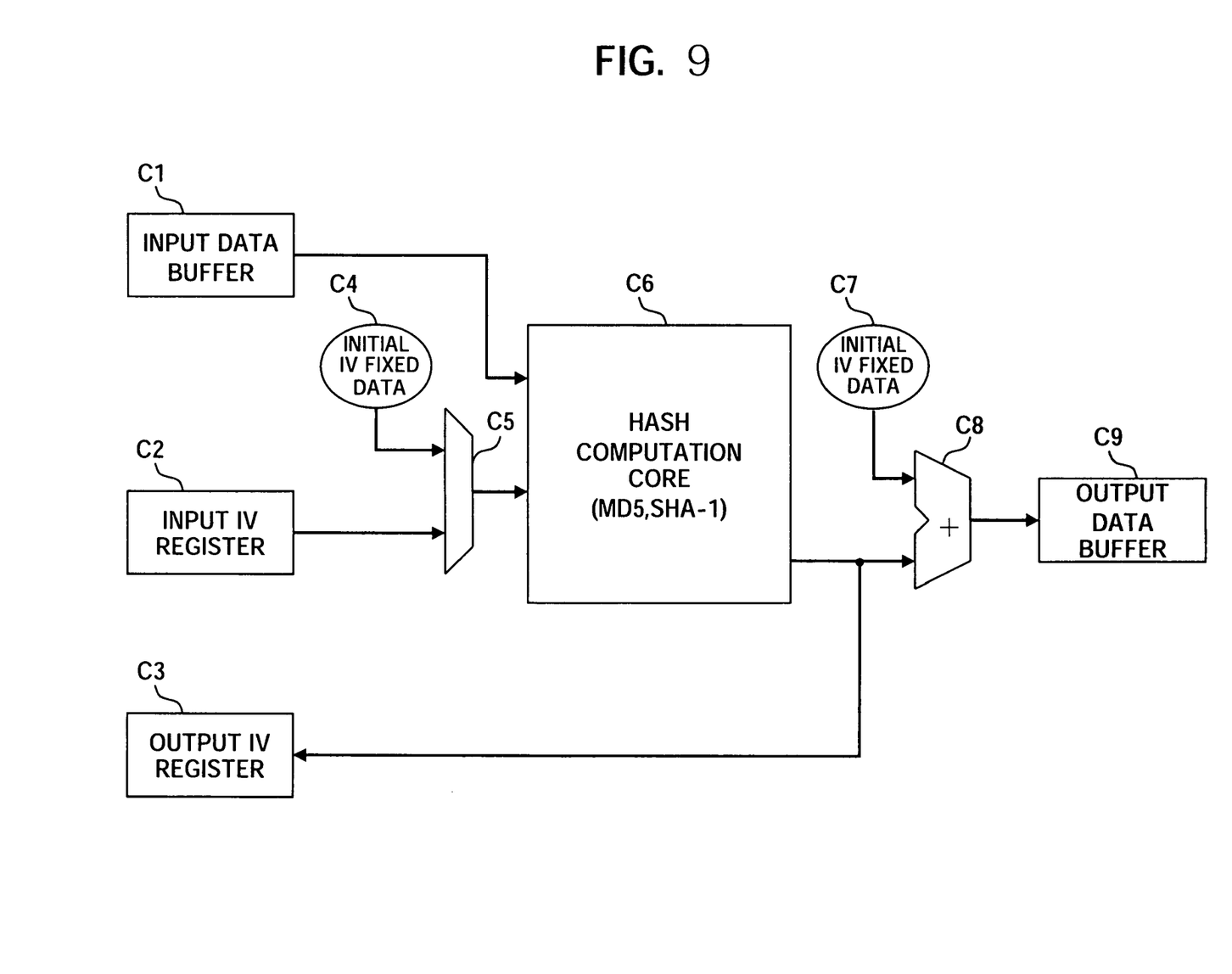
FIG. 9 is a block diagram of an example of the configuration of a hash block.

FIG. 9 is a block diagram of an example of the configuration of the hash block 18 in the encryption apparatus 10 of FIG. 1.

The hash block 18 of FIG. 9 has an input data buffer C1, an input IV register C2, an output IV register C3, a initial IV fixed data (output portion) C4, selector circuit C5, hash computation core (MD5, SHA-1) C6, an initial IV fixed data (output portion) C7, an adder circuit C8, and output data buffer C9.

The input data buffer C1 fetches the output data from the selector circuit 15 of FIG. 1 and supplies the data to be processed into the hash block.

The input IV register C2 fetches the output data from the IV register 19 of FIG. 1 and supplies it as the IV data into the hash block.

The output IV register C3 supplies the data which becomes the intermediate computation result in the hash block into the IV register 19 of FIG. 1.

The output data buffer C9 supplies the already processed data to the selector circuit 20 of FIG. 1.

As the input data to the hash computation core (MD5, SHA1) C6, the output of the input data buffer C1 and the output of the selector circuit C5 are input.

The selector circuit C5 selects the output of the initial IV fixed data C4 where no restart is instructed by the DMA descriptor and selects the output of the IV register C3 where restart is instructed.

As the input data to the output data buffer C9, the result of computing the output data of the hash computation core (MD5, SHA-1) C6 and the initial IV fixed data C7 at the adder circuit C8 is input.

As the input data to the output IV register C3, the output data of the hash computation core (MD5, SHA-1) C6 is input.

The data before addition to the initial IV fixed data C7 (data sequentially output for every 512 bytes as the processing unit of hash) becomes the intermediate computation result. This intermediate computation result is held as IV.

Figure 10:
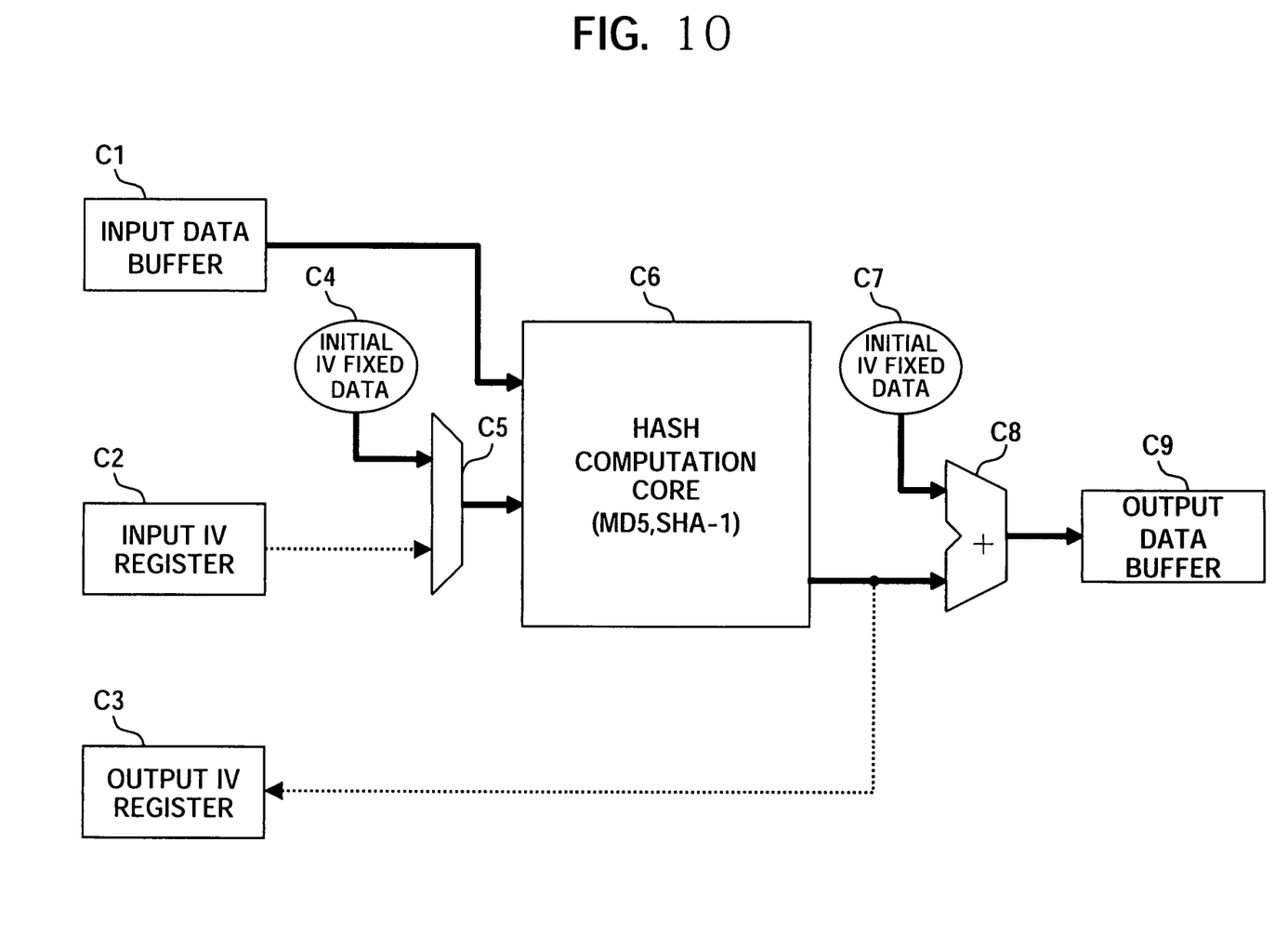
FIG. 10 is a block diagram of a data path in a case of no interruption and no restart of the hash computation.

FIG. 10 is a diagram of a data path in the case of no interruption and no restart.

A data path selected is indicated by the solid line in FIG. 10 in the block structure shown in the block diagram of FIG. 9 where the descriptor instructs no interruption and no restart.

In this case, as the IV data input to the hash computation core (MD5, SHA-1) C6, the initial IV fixed data C4 is selected. The computation result is stored in the output data buffer C9.

Figure 11:
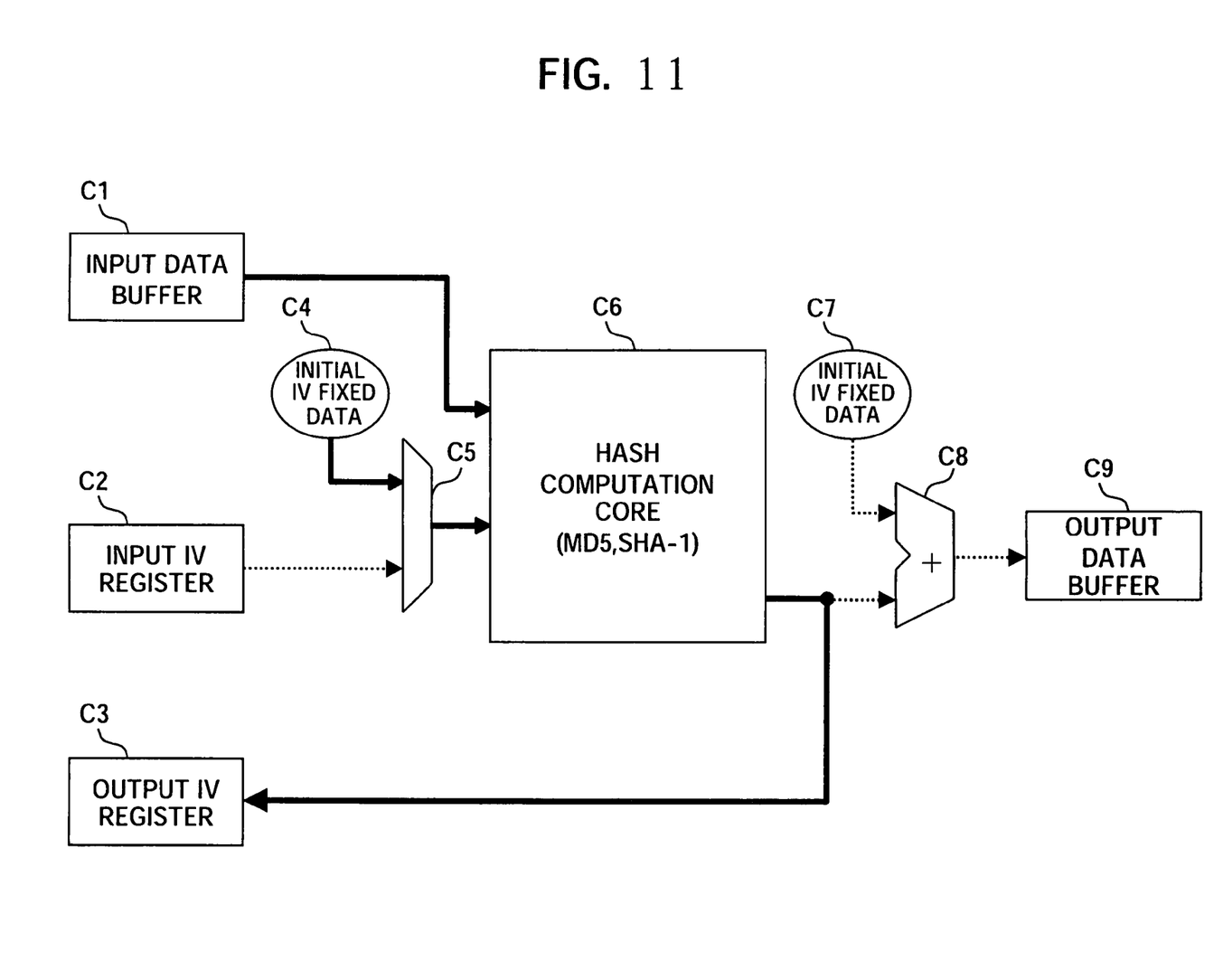
FIG. 11 is a block diagram of a data path in a case of interruption, but no restart of the hash computation.

FIG. 11 is a diagram of a data path in the case of interruption, but no restart in FIG. 9.

A data path selected is indicated by the solid line in FIG. 11 in the block structure shown in the block diagram of FIG. 9 where the descriptor instructs interruption, but no restart.

In this case, as the IV data input to the hash computation core (MD5, SHA-1) C6, the initial IV fixed data C4 is selected. The intermediate computation result is stored in the output IV register C3.

Figure 12:
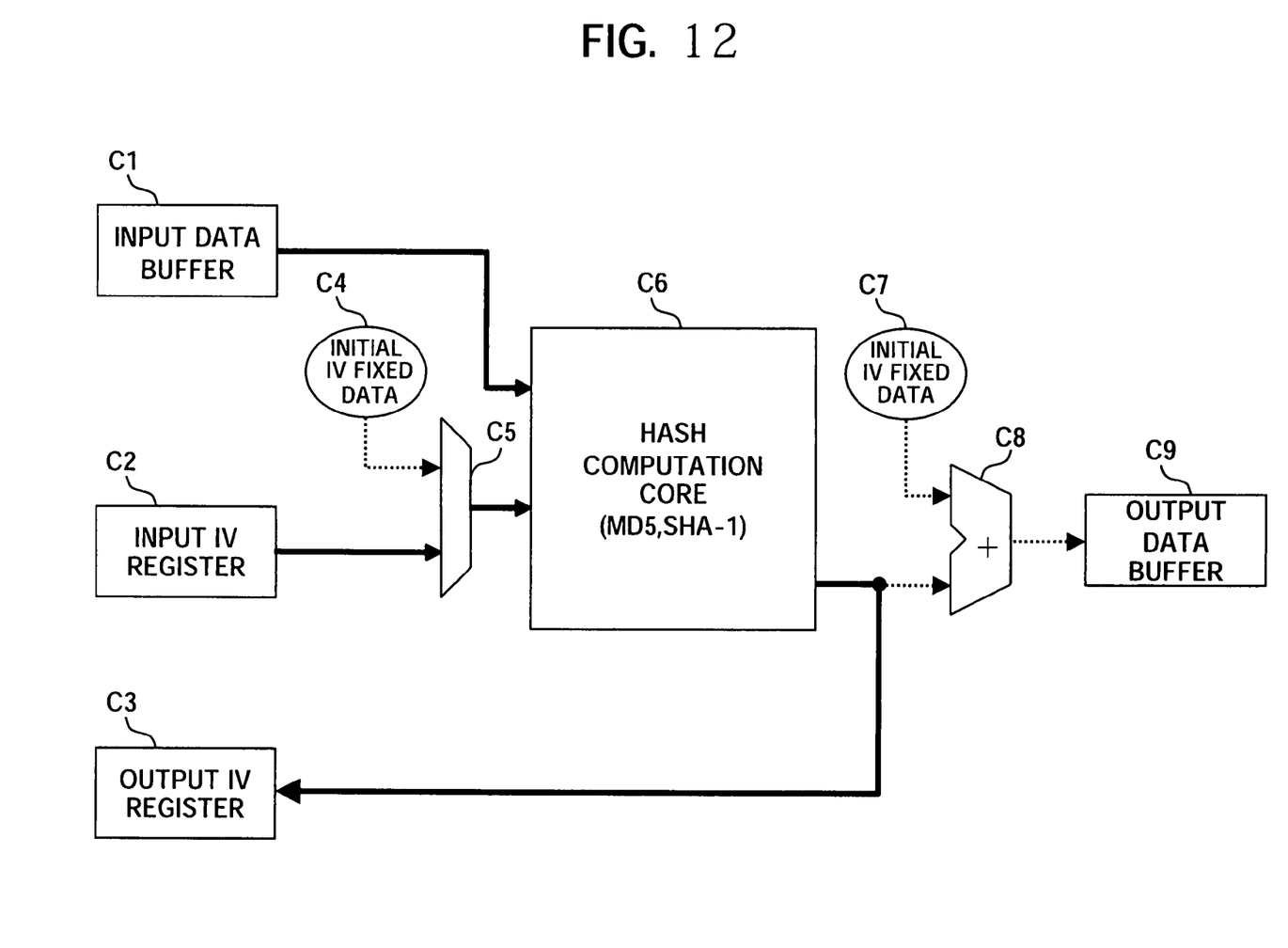
FIG. 12 is a block diagram of a data path in a case of interruption and restart of the hash computation.

FIG. 12 is a diagram of a data path in the case of the interruption and restart in FIG. 9.

A data path selected is indicated by the solid line in FIG. 12 in the block structure shown in the block diagram of FIG. 9 where the descriptor instructs interruption and restart.

In this case, as the IV data input to the hash computation core (MD5, SHA-1) C6, the input IV register C2 is selected. The intermediate computation result is stored in the output IV register C3.

Figure 13:
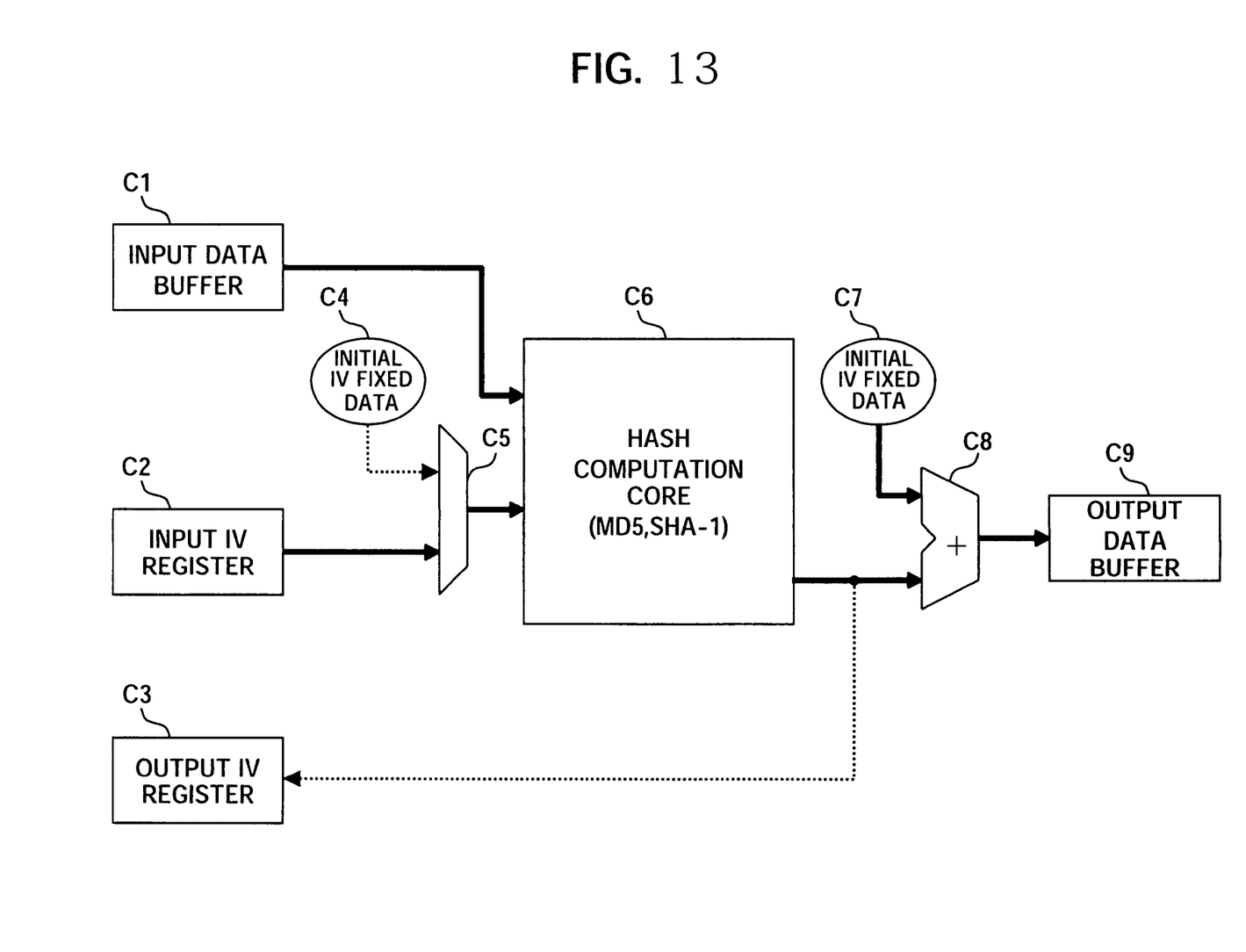
FIG. 13 is a block diagram of a data path in a case of no interruption, but restart of the hash computation.

FIG. 13 is a diagram of a data path in the case of no interruption, but restart in FIG. 9.

A data path selected is indicated by the solid line in FIG. 13 in the block structure shown in the block diagram of FIG. 9 where the descriptor instructs no interruption, but restart.

In this case, as the IV data input to the hash computation core (MD5,SHA-1) C6, the input IV register C2 is selected. The computation result is stored in the output data buffer C9.

Due to this, even in the hash processing, in the same way as the operation of the encryption interruption/restart in the common key cipher, by just storing/loading the value of the IV register (IV register 6 of FIG. 1) by the CPU or DMAC, interruption/restart of hash processing easily becomes possible.

As explained above, according to the present embodiment, the transfer data to be processed from the data storage memory 12 is controlled by the DMAC 14 based on a DMA descriptor. The DMA descriptor provides information as a descriptor format which has a field for instructing a cipher algorithm of a common key cipher such as DES or AES and a field for instructing an encryption mode such as the ECB mode, CBC mode, or Counter Mode.

Therefore it becomes possible to designate the corresponding processing content, for example, DES-CBC encryption or AES-Counter Mode encryption, the transfer data position, and the transfer size for the data to be processed stored in the data storage memory.

Due to this, at the point of time when the size and processing mode of the data to be processed are decided, the CPU generates the descriptor and only requests DMA processing, therefore the encryption can be efficiently carried out.

Provision is made of a common key cipher block functioning as a storing portion for setting the IV used at the time of the processing in various encryption modes (CBC mode, Counter Mode), the portion for automatically generating the IV which will be used at the time of the next block processing, and the storing portion for holding that.

Therefore, it is possible to store the IV at the time of the interruption of the processing by the CPU 11 and set the stored IV at the time of the restart of the processing, the restart of the processing becomes easy.

Further, by requesting the processing to store/load the IV to the DMA, the intervention of the CPU 11 is further suppressed. Further, the interruption/restart of processing becomes possible.

Therefore it also becomes possible to previously process the data to be processed having a high priority order and the effect of realizing the desired QoS can be expected. Further, it becomes possible to perform processing in a division manner.

As a result, an improvement of the bus specifications and efficiency and higher efficiency of the processing by pseudo parallel processing can be expected.

Further, according to the present embodiment, the transfer data to be processed from the data storage memory 12 is controlled by the DMAC 14 based on a DMA descriptor. The DMA descriptor provides information as a descriptor format which has a field for designating a hash algorithm such as MD5 or SHA-1, a field for instructing interruption of hash processing, and a field for instructing restart of hash processing.

Therefore, it becomes possible to designate the corresponding processing content, for example, the interruption of MD5 or the restart of SHA-1, the transfer data position, and the transfer size with respect to the data to be processed stored in the data storage memory.

Due to this, at the point of time when the size of the data to be processed and the processing mode are decided, the CPU 11 generates the DMA descriptor and only requests the DMA processing.

Therefore, in the same way as encryption, the processing can be efficiently carried out also for hash processing.

Provision was also made of a hash block functioning as a storing portion for holding the intermediate computation result at the time of the interruption of the hash processing and a storing portion able to set the intermediate computation result at the time of the restart of the hash processing.

Therefore, the CPU 11 stores the IV thereof at the time of the interruption of the processing and sets the stored IV at the time of the restart of the processing and thereby easily restarts the processing.

Further, by requesting processing to also store/load IV to the DMA, the intervention of the CPU 11 is further suppressed.

Further, the interruption/restart of processing becomes possible, therefore it also becomes possible to previously process the data to be processed having a high priority order and the effect of realization of QoS is expected.

Further, it becomes possible to perform the processing in a division manner, therefore an improvement of the bus specifications and efficiency and higher efficiency of the processing by pseudo parallel processing can be expected.

Summarizing the effects of the embodiment of the present invention, according to the present embodiment, there is the advantage that the interruption/restart function of various types of encryption can be efficiently performed by enabling efficient judgment of conditions etc. by hardware and by storing/loading the intermediate computation data at the time of interruption/restart by software without regard as to the differences of various types of cipher algorithms and the differences of the encryption modes.

It should be understood by those skilled in the art that various modifications, combinations, sub-combinations, and alterations may occur depending on design requirements and other factors insofar as they are within the scope of the appended claims or the equivalents thereof.

What is claimed is:

1. An encryption apparatus having an encryption interruption/restart function and temporarily interrupting packet processing accompanied with encryption to process with precedence packets having a higher priority order, comprising:
a data storage memory for storing data to be processed,
a common key cipher block for encrypting transferred data to be processed by a common key cipher,
a hash block for hash processing of the transferred data to be processed, and
a memory access controller for controlling data transfer from the data storage memory to the common key cipher block and the hash block based on a descriptor providing information instructing the transfer data to be processed from the data storage memory, wherein
the descriptor includes a descriptor format for instructing a cipher algorithm in the common key cipher and for instructing an encryption mode when instructing transfer of data to the common key cipher block, and for instructing a hash algorithm in a hash computation, for instructing an interruption of hash processing, and for instructing a restart of hash processing when instructing transfer of data to the hash block.

* * * * *